Sept. 6, 1966  R. H. CALDERWOOD ET AL  3,271,509
ELECTRICAL INSULATION FOR CONDENSER BUSHINGS AND THE LIKE
Filed April 12, 1963

WITNESSES
Theodore F. Wrobel
James F. Young

INVENTORS
Harry R. Sheppard, Jr.
Robert H. Calderwood and Jacob Chottiner
BY Alex Mich Jr.
ATTORNEY United States Patent Office 3,271,509
Patented Sept. 6, 1966

3,271,509
ELECTRICAL INSULATION FOR CONDENSER BUSHINGS AND THE LIKE
Robert H. Calderwood, Hampton Township, Allegheny County, Jacob Chottiner, McKeesport, and Harry R. Sheppard, Jr., Sharon, Pa., assignors to Westinghouse Electric Corporation, East Pittsburgh, Pa., a corporation of Pennsylvania
Filed Apr. 12, 1963, Ser. No. 272,749
13 Claims. (Cl. 174—121)

This invention relates generally to resin impregnated electrical insulation and more specifically to resin impregnated sheet, plate, tubular and like forms of laminated electrical insulation.

Developments in the design of electrical apparatus have imposed rigorous demands on electrical insulation. The electrical insulation must not only have excellent initial properties to withstand the encountered environmental conditions, but these properties must not be unduly degraded after prolonged periods of exposure. Degradation of organic electrical insulation is ordinarily accelerated by exposures to elevated operating temperatures. Laminated electrical insulation, fabricated from a resin-paper system, is susceptible to accelerated degradation at elevated temperatures since both the resin and paper are organic materials. Resin impregnated paper, cotton cloth and like cellulosic base materials have been widely employed in laminated form as electrical insulation. The laminates may be in sheet, plate or tubular form. A phenolic resin-paper system has, for example, been employed to form high voltage condenser bushings.

Condenser bushings have been made by wrapping a phenolic resin coated and impregnated kraft paper on a mandrel to form an insulating wall of the desired thickness. The wrapping is done against a heated roll which fuses the resin between the turns of the paper. A specified number of aluminum foil sheets are also wound into the bushing to provide the desired capacitance for the condenser bushing. The cure of the phenolic resin is completed in an oven at 135° C. to provide a bushing blank which is machined to desired dimensions. In order to improve the track and arc resistance of the bushing surface, an aluminum oxide trihydrate filled epoxy resin coating may be applied to and cured on the bushing.

The phenolic resin-kraft paper condenser bushings described may be installed in switchgear apparatus which is designed to operate at 90° C. or less and function satisfactorily. However, under present day operating conditions, much greater loads than normal are being put on power equipment in general, including switchgear apparatus.

Condenser bushings, bus bar sleeving and like insulating members are exposed to high voltage alternating currents. When so exposed, an energy loss in the changing electrical field is manifested as an increase in insulation temperature. This phenomenon has been explained on the basis of an asymmetrical distribution of electrical charges in the molecular structure of the insulation. The molecular asymmetry or molecular dipoles have a tendency to align in an electrical field. The physical state of the insulation, especially the solid state, will offer resistance to the tendency to align. In an alternating current field, the direction of alignment tendency is constantly changing. Thus, the structural resistance to alignment of the molecular dipoles will produce the internal energy loss.

The power factor of an insulation is a measure of the relative energy loss described. As the operating temperature of the apparatus is increased, the power factor of the insulating material is increased, indicating that the relative energy loss is increased. This problem has been specifically noted in the described condenser bushings. As the power factor increases, the internal heat is built up in the condenser bushings. If the rate of power factor increase is too great for a small increase in operating temperature, a condition is soon reached where the heat generated in the insulation will cause a rapid degradation of the insulating material and consequent failure of the equipment.

Normally, a power factor of less than 15% at the maximum operating temperature of the equipment is considered satisfactory. Bushings made from the phenolic resin-kraft paper described above have a power factor in excess of 25% at 105° C. It is apparent that this material has a power factor at 105° C. which exceeds safe operating conditions.

In addition to exhibiting a low power factor at elevated temperatures, electrical insulation, including the described condenser bushings, must meet prescribed limits of flame resistance in some applications. Flame resistance may be imparted to cellulosic insulation by certain additives, as for example, ammonium sulfamate, chlorinated polyvinyl resins and the like. Other additives which impart flame resistance to cellulosic insulaiton are, of course, known in the art. Most of these additives increase the power factor of the insulation and it is apparent that the problem of providing insulation with a satisfactory power factor at elevated temperatures is compounded when it must also meet rigid flame resistance specifications.

In addition to the foregoing requirements the coated and impregnated cellulosic sheet which is employed to fabricate laminated insulation, must have a long storage life, must not block when stored in rolls, must cure and bond well, and must produce insulation which will not delaminate easily. Other processing requirements, obvious to those skilled in the art, must also be met.

Accordingly, it is the general object of this invention to provide cellulosic based electrical insulation with improved properties at elevated temperatures.

A more particular object of this invention is to provide resin impregnated cellulosic based laminated insulation having a low power factor at elevated temperatures with satisfactory flame resistance.

Another object of this invention is to provide condenser bushings adapted for use in power circuit breakers which operate at elevated temperatures.

Yet another object of this invention is to provide bus bar sleeving and like insulation having a low power factor at elevated temperatures.

Briefly, the present invention accomplishes the above cited objects by providing cellulosic based sheet insulation with a combination of chemical compound additives thoroughly impregnating and dispersed throughout the cellulosic fibers with the sheets impregnated and/or coated with certain resinous materials. These treated cellulosic sheets are then employed to fabricate laminated sheet, plate and tubular insulation. More specifically, a cellulosic sheet, stabilized with critical amounts of malamine and/or dicyandiamide is impregnated and coated with a specific epoxy based resin. A plurality of these treated sheets, to form an insulating layer of the desired thickness, are laid up or stacked together to form a laminated sheet, plate or tube and the stack is heated to cure the resin and form a unitary composite structure.

Further objects and advantages of the invention will become apparent as the following description proceeds and features of novelty which characterize the invention will be pointed out in particularity in the claims annexed to and forming a part of this specification.

For a better understanding of this invention, reference may be had to the accompanying drawing in which.

Figure 1:
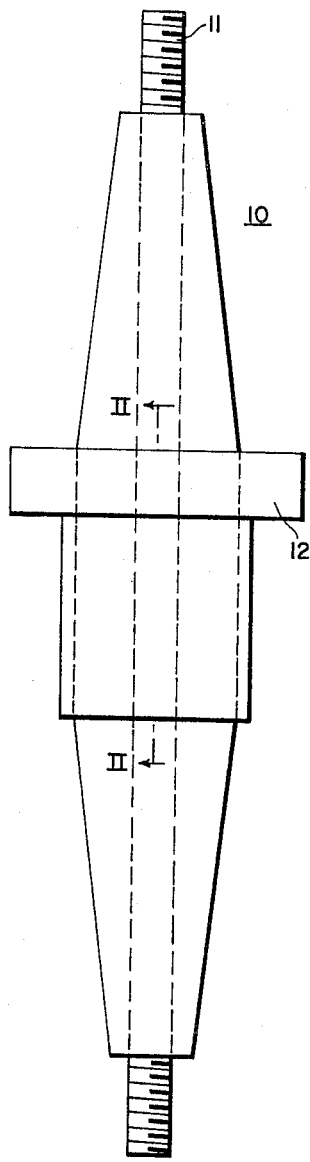
FIGURE 1 shows a condenser bushing representing one embodiment of the invention.

It is known that a combination of melamine and dicyanidiamide improves the resistances to heat deterioration and electrical properties of cellulosic materials when impregnated and distributed in certain critical amounts in the cellulosic fibers. It has now been discovered, in accordance with the present invention, that certain epoxy based resins may be employed in combination with the heat stabilized paper to provide laminated electrical insulation having an improved power factor at elevated temperatures.

The cellulosic material should preferably contain from about 0.5 to 5%, by weight, of melamine, dicyandiamide and polyacrylamide. Small amounts of polyacrylamide, i.e. in the order of about 0.1 to 1%, based on the weight of the cellulosic insulation enhance the beneficial results, but melamine and dicyandiamide alone may be used. Although the combination of melamine and dicyandiamide appears to have a synergistic effect, in some circumstances only one of these may be employed with attendant advantages. In that event, the single material may be employed in the concentration range specified for both. The relative proportions of melamine may be from 1 to 4 parts, the dicyandiamide from 5 to 1 parts, the polyacrylamide from 0.1 to 1 part. As little as about 0.02% or as great as 10%, by weight, of the additive compounds melamine, dicyandiamide and polyacrylamide may be employed. Reference may be had to U.S. 3,102,159 issued on August 27, 1963, and assigned to the assignee of this invention for additional specific details and methods of preparing such stabilized cellulosic materials.

As noted briefly hereinabove, only certain epoxy based resins are employed with the described stabilized cellulosic material. In the laminated insulation, this resin permits a good bond to be formed between the layers of stabilized paper, which is not the case with most resins. Moreover, resin treated paper in accordance with this invention can be dried and can be handled in rolls without blocking and may be stored for prolonged periods with a satisfactory shelf life. In combination with the described stabilized paper, these resins permit the fabrication of laminated products with surprisingly low power factors at elevated temperatures.

The resinous materials for use in this invention preferably are epoxy resins selected from at least one of the group consisting of (1) 3,4-epoxy-6-methylcyclohexyl-methyl-3,4-epoxy-6-methyl-cyclohexane carboxylate and (2) dicyclopentadiene dioxide. The epoxy resins are liquid and should be mixed with an anhydride cross-linking agent before the application to the cellulosic base sheet material. Where the resin is to be applied to the sheet material and the laminate is to be formed therefrom within a reasonable time thereafter, as for example about 72 hours, any of the known anhydride cross-linking agents, as for example, dodecyl succinic anhydride, chlorendic anhydride, hexahydrophalic anhydride, methyl endomethylene tetrahydrophthalic anhydride, maleic anhydride or trimellitic anydride, may be employed. From about 10 up to about 60 phr. (parts per 100 parts of resin, based on weight) of the anhydride cross-linking agent should be employed.

Where a longer time will elapse and the coated paper is to be stored in rolls to be used for the fabrication of laminates at some indeterminable future date, it is preferable to employ dicyclopentadiene dioxide with a curing system of maleic anhydride and an aliphatic polyol, as for example, trimethylol propane. The anhydride ring is opened by esterification with the hydroxyl radical of the polyol and initiates the cross-linking of the epoxy resin. The dicyclopentadiene dioxide, maleic anhydride and trimethylol propane are added to a reaction vessel together with toluene and refluxed to form a B-staged resinous composition. This B-staged resinous composition may be applied to the cellulosic base material as a solution. The solvent is then evaporated from the applied coating and the base material may be stored for prolonged periods without blocking. From about 40 to 60 phr. of the anhydride and up to about 10 phr. of polyol are preferred.

The impregnated coated stabilized cellulosic base sheet material is stacked to make up a desired thickness of sheet, plate or tubular laminate and the composite is heated to cure the resin to its infusible solid state to act as a binder for the laminations.

To provide a better understanding of the practice of this invention, the following specific examples are given as illustrations.

*Example I*

The base sheet material is a 3.5 mil thick kraft paper having a concentration of 2.75 to 4.0%, by weight of the paper, of melamine, dicyandiamide and polyacrylamide in respective weight proportions of 1.5 to 3.0 to 0.25. About 38 phr. of phthalic anhydride is added to a methylated cyclohexane diepoxide resin (3,4-epoxy-6-methylcyclohexyl - methyl - 3,4-epoxy-6-methylcyclohexane carboxylate). From about 1.5 to 2.0 grams of the liquid resinous material is spread on each of 20 sheets of 6″ x 6″ kraft paper. The resinous coating is heated to 100° C. and kept at that temperature during the layup procedure. The coated sheets are stacked together to form a laminate and cured at 125° C. for 2 hours at contact pressure. The power factor of the laminate at 100° C. was 2.1 percent (ASTM D–150, 10 volt test).

*Example II*

The base meterial in this example was the kraft paper employed in Example I. About 38 phr. of hexahydrophthalic anhydride was added to the described methylated cyclohexane diepoxide resin. Twelve grams of a silica aerogel having an average particle size of 0.3 to 0.5 micros was added to 100 grams of the resinous mixture in order to form a thixotropic coating material. A quantity of the filled resin, equal to the weight of the paper, was applied to the surface of the sheets. Twenty of the coated sheets were stacked together and cured for 2 hours at 125° C. at contact pressure to form a ⅟₁₆″ thick laminate. The power factor of the laminate was 1.1% at 100° C.

*Example III*

The base material in this example was the kraft paper employed in Example I. The resinous coating material was prepared by adding, by weight, 100 parts of dicyclopentadiene dioxide, 48.4 parts of maleic anhydride, 6.7 parts of trimethylol propane and 78.5 parts of toluene to a reaction vessel. The mixture was heated to reflux (130° C.) and reacted for 4 hours. The mixture was cooled to 50° C. and 27.8 parts, by weight, of acetone was added. The resinous solution had 60% solids and a viscosity of 150 centipoise at room temperature. The base material was coated with sufficient resin to have a coating ratio (weight of resin coated paper compared to weight of uncoated paper) of about 1.65. Twenty sheets of the coated paper were stacked and cured for 4 hours at 160° C. to form a ⅟₁₆″ thick laminate. The power factor of the laminate was 1.1% at 100° C.

In order to further aid those skilled in the art in the practice of this invention, the following specific examples of laminated rolled bushings are presented hereinbelow by way of illustration. It should be understood that all test bushings were identical dimensionally.

*Example IV*

A 200 foot roll of 20″ wide kraft paper containing from 2.75 to 4%, by the paper weight, of melamine, dicyandiamide and polyacrylamide in respective weight proportions of 1.5 to 3.0 to 0.25, was coated with the resinous B-staged eepoxy resin described in Example III to provide a coating of 8 grams per square foot of paper. The paper was rolled under pressure into a bushing on a rolling machine. The bushing was wrapped with a sheet of cellophane, taped and cured at 125° C. for 14 hours. This bushing was machined without evidence of delamination. The high voltage power factor at 105° C. and 125° C. was 3.03 and 8.38 percent, respectively. The power factor tests were conducted in accordance with the high voltage Schering bridge method outlined in ASTM D-150 at 10 kv.

*Example V*

A kraft paper sample identical to that described in Example IV, was coated on both sides with the B-staged epoxy resin described in Example III to a coating ratio of 1.47. The paper was passed through a tower at 110° C. at a rate of 32 inches per minute to evaporate the solvent. The coated paper could be rolled and unrolled with no evidence of blocking. A rolling machine with rolls at a temperature of 65 to 90° C. was employed to form a bushing from the resin coated paper which was cured at 135° C. for 16 hours and given a post cure of 4 hours at 160° C. This bushing was machined with no evidence of delamination. Power factor, measured as in Example IV, was 3.6% at 105° C. and 8.6% at 125° C.

*Example VI*

A coated kraft paper sample, identical to that described in Example V except for a coating ratio of 1.68, was employed to prepare another rolled bushing. The bushing was cured and machined with no evidence of delamination. Power factor, measured as in Example IV, was 4.33% at 105° C. and 7.75% at 125° C.

*Example VII*

A sample of kraft paper, identical to that described in Example IV except that it did not contain the added dicyandiamide, melamine and polyacrylamide, was coated with the resin described in Example III, cured for 4 hours at 160° C. and machined with no evidence of delamination. Power factor, measured as in Example IV, was 14.55% at 125° C.

*Example VIII*

A sample of sulfite paper (Hurlbut 304FGI), 0.0035 inch thick containing from 2.75 to 4%, by weight of the paper, of melamine, dicyandiamide and polyacrylamide in respective weight proportions of 1.5 to 3.0 to 0.25 and containing about 10 to 15 percent of ammonium sulfamate, based on the weight of the paper, was coated with the resinous material described in Example III to provide a finished coating ratio of about 1.5 to 1.77, i.e. 50 to 77% of coating based on the paper. A series of bushings were rolled as in the foregoing example, cured for 4 hours at 160° C. and machined with no evidence of delamination. Power factors, measured as in Example IV, had values up to a maximum of 10.6%. An ignition time of 81 seconds and burning time of 23 seconds was measured on samples of this bushing in flammability tests conducted in accordance with NEMA Standard, SG-5-4.14(a) (April 1961). Limits of the test are a minimum ignition time of 60 seconds and a maximum burning time of 100 seconds.

It is to be understood that the cellulosic base sheet material employed in this invention may be any of the several varieties commonly employed in the laminated plastics art and includes kraft, alpha and rag paper as well as cotton cloth. The stabilizing additives melamine, dicyandiamide and polyacrylamide may be employed with all of these base materials with beneficial results generally and with a surprisingly low power factor when the treated paper is used with the described epoxy resins.

The stabilized cellulosic sheet may also contain from about 5 to 20%, by weight, of additives which impart flame resistance to the sheet, as for example ammonium sulfamate, ammonium sulfate, ammonium phosphate, tetrakishydroxymethyl phosphonium chloride and chlorinated polyvinyl resins. When employed with the described epoxy resins, this sheet material will produce laminates with a minimum ignition time of 60 seconds, a maximum burning time of 100 seconds and a power factor at 105° C. less than 15%.

The epoxy resin should be employed in sufficient quantity to provide a coating ratio of about 1.4 to 1.9, but preferably in the range of 1.5 to 1.6. Thixotropic agents, as for example, colloidal silicas or kaolinites may be employed in amounts up to about 15%, by weight.

Figure 2:
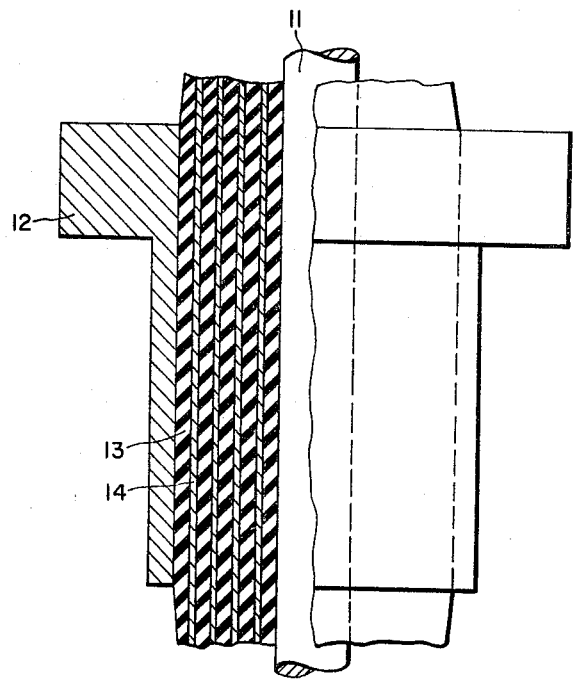
FIG. 2 is a cross-sectional view of FIG. 1 taken along the plane II—II.

Referring now to FIG. 1, we have illustrated a condenser bushing 10 comprising a conductor or stud 11 surrounded by alternate layers of the laminated insulation described heretofore and conductive metallic foil sheets to provide a voltage gradient between the stud 11 and the ground flange tube 12. In FIG. 2, the alternating layers of laminated insulation 13 and metal foil 14 are clearly illustrated. It should be understood that the layer 13 may be made of plural sheets of cellulosic base material impregnated and bound together by the resin described. The metallic foil 14 may be aluminum, for example, and may be interleaved during the tube rolling process.

Figure 3:
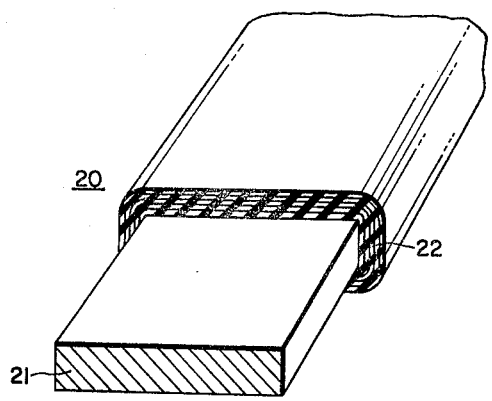
FIG. 3 shows an insulating sleeve for bus bars, representing another embodiment of this invention.

In FIG. 3, we have illustrated an insulated bus duct 20 comprising a bus bar conductor 21 insulated by a laminated tube 22 of this invention.

By means of the present invention, laminated insulation which will satisfactorily perform in applications where it is exposed to high voltage alternating currents and elevated temperatures is provided. Reliable service for prolonged periods under these conditions may be expected.

While there have been shown and described what are at present considered to be the preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

We claim:

1. Laminated electrical insulation comprising plural layers of cellulosic fibers in sheet form having distributed throughout the sheet from about 0.02% to about 10%, based on the weight of the fibers, of at least one material selected from the group consisting of melamine, dicyandiamide and mixtures of melamine and dicyandiamide, the mixtures varying in proportions from 1 to 5 parts of dicyandiamide and 1 to 4 parts of melamine, by weight, said layers bound together into a unitary mass by a solid, infusible composition derived from the reaction of an epoxy resin selected from the group consisting of (1) 3,4-epoxy-6-methylcyclohexylmethyl-3,4-epoxy-6-methylcyclohexane carboxylate and (2) dicyclopentadiene dioxide with about 10 to 60 parts an anhydride cross-linking agent per 100 parts of epoxy resin, by weight.

2. Laminated electrical insulation comprising plural layers of cellulosic fibers in sheet form having distributed throughout the sheet from about 0.02% to about 10%, based on the weight of the fibers, of a mixture of melamine and dicyandiamide, the mixture varying in proportions from 1 to 5 parts of dicyandiamide and 1 to 4 parts of melamine, by weight, said layers bound together into a unitary mass by a solid, infusible composition derived from the reaction of the epoxy resin dicyclopentadiene dioxide with 40 to 60 parts of maleic anhydride per 100 parts of epoxy resin and up to about 10 parts of an aliphatic polyol per 100 parts of epoxy resin, by weight.

3. Laminated electrical insulation comprising plural layers of cellulosic fibers in sheet form having distributed throughout the sheet (A) from about 0.02% to about 10%, based on the weight of the fibers, of at least one material selected from the group consisting of dicyandiamide, melamine and a mixture of melamine and dicyandiamide, the mixture varying from 1 to 5 parts of dicyandiamide and 1 to 4 parts of melamine, by weight, and (B) from about 5 to 20 percent, based on the weight of the fibers, of a fire retardant additive selected from the group consisting of (1) ammonium sulfamate, (2) ammonium sulfate, (3) ammonium phosphate, (4) chlorinated polyvinyl resins and (5) tetrakishydroxymethyl phosphonium chloride, said layers bound together into a unitary mass by a solid, infusible composition derived from the reaction of an epoxy resin selected from the group consisting of (1) 3,4-epoxy-6-methylcyclohexylmethyl-3,4-epoxy-6-methylcyclohexane carboxylate and (2) dicyclopentadiene dioxide with about 10 to 60 parts of an anhydride cross-linking agent per 100 parts of epoxy resin, by weight.

4. Laminated electrical insulation comprising plural layers of cellulosic fibers in sheet form having distributed throughout the sheet from about 0.5 to 5%, based on the weight of the fibers, of a mixture of melamine, dicyandiamide and polyacrylamide, the mixture varying in proportions from 1 to 5 parts of dicyandiamide, 1 to 4 parts of melamine and 0.1 to 1 part of polyacrylamide, by weight, said layers bound together into a unitary mass by a solid, infusible composition derived from the reaction of an epoxy resin selected from the group consisting of (1) 3,4-epoxy-6-methylcyclohexylmethyl-3,4-epoxy-6-methylcyclohexane carboxylate and (2) dicyclopentadiene dioxide with from about 40 to 60 parts of maleic anhydride per 100 parts of resin and up to about 10 parts of trimethylol propane per 100 parts of resin, by weight.

5. A laminated bushing having insulation adapted for prolonged exposure to high voltage alternating currents at elevated temperatures, the insulation comprising plural layers of cellulosic fibers in sheet form having distributed throughout the sheet from about 0.5 to about 5%, based on the weight of the fibers, of a mixture of melamine, dicyandiamide and polyacrylamide, the mixture varying in proportions from 1 to 5 parts of dicyandiamide, 1 to 4 parts of melamine and 0.25 to 1 part of polyacrylamide, by weight, said layers bound together into a unitary mass by a solid, infusible composition derived from the reaction of the 3,4-epoxy-6-methylcyclohexylmethyl-3,4-epoxy-6-methylcyclohexane carboxylate and about 40 to 60 parts of maleic anhydride per 100 parts of the diepoxide and up to about 10 parts of trimethylol propane per 100 parts of diepoxide, by weight.

6. A laminated bushing having insulation adapted for prolonged exposure to high voltage alternating currents at elevated temperatures, the insulation comprising plural layers of cellulosic fibers in sheet form having distributed throughout the sheet from about 0.02 to about 10%, based on the weight of the fibers, of at least one material selected from the group consisting of melamine, dicyandiamide, mixtures of melamine and dicyandiamide and mixtures of melamine, dicyandiamide and polyacrylamide, the mixtures varying in proportions from 1 to 5 parts of dicyandiamide, 1 to 4 parts of melamine and 0.25 to 1 part of polyacrylamide, by weight, said layers bound together into a unitary mass by a solid, infusible composition derived from the reaction of an epoxy resin selected from the group consisting of (1) 3,4-epoxy-6-methylcyclohexylmethyl-3,4-epoxy-6-methylcyclohexane carboxylate and (2) dicyclopentadiene dioxide with about 10 to 60 parts of an anhydride cross-linking agent per 100 parts of epoxy resin, by weight.

7. The laminated electrical insulation of claim 1 in which the epoxy resin is 3,4-epoxy-6-methylcyclohexylmethyl-3,4-epoxy-6-methylcyclohexane carboxylate.

8. The laminated electrical insulation of claim 1 in which the epoxy resin is dicyclopentadiene dioxide.

9. The laminated electrical insulation of claim 1 in which the anhydride cross-linking agent is selected from the group consisting of dodecyl succinic anhydride, chlorendic anhydride, hexahydrophthalic anhydride, methyl endomethylene tetrahydrophthalic anhydride, maleic anhydride and trimellitic anhydride.

10. The laminated bushing of claim 6 in which the epoxy resin is 3,4-epoxy-6-methylcyclohexylmethyl-3,4-epoxy-6-methylcyclohexane carboxylate.

11. The laminated bushing of claim 6 in which the epoxy resin is dicyclopentadiene dioxide.

12. The laminated bushing of claim 6 in which the anhydride cross-linking agent is selected from the group consisting of dodecyl succinic anhydride, chlorendic anhydride, hexahydrophthalic anhydride, methyl endomethylene tetrahydrophthalic anhydride, maleic anhydride and trimellitic anhydride.

13. A laminated bushing having insulation adapted for prolonged exposure to high voltage alternating currents at elevated temperatures, the insulation comprising plural layers of cellulosic fibers in sheet form having distributed throughout the sheet (A) from about 0.02 to about 10%, based on the weight of the fibers, of at least one material selected from the group consisting of dicyandiamide, melamine, mixtures of melamine and dicyandiamide and mixtures of melamine, dicyandiamide and polyacrylamide, the mixtures varying in proportions from 1 to 5 parts of dicyandiamide, 1 to 4 parts of melamine and 0.25 to 1 part of polyacrylamide, by weight, and (B) from about 5 to 20%, based on the weight of the fibers, of a fire retardant additive selected from the group consisting of (1) ammonium sulfamate, (2) ammonium sulfate, (3) ammonium phosphate, (4) chlorinated polyvinyl resins and (5) tetrakishydroxymethyl phosphonium chloride, said layers bound together into a unitary mass by a solid, infusible composition derived from the reaction of an epoxy resin selected from the group consisting of (1) 3,4-epoxy-6-methylcyclohexylmethyl - 3,4-epoxy-6-methylcyclohexane carboxylate and (2) dicyclopentadiene dioxide with about 10 to 60 parts of an anhydride cross-linking agent per 100 parts of epoxy resin, by weight.

References Cited by the Examiner

UNITED STATES PATENTS

| | | | |
|---|---|---|---|
| 2,771,379 | 11/1956 | Dario. | |
| 2,786,794 | 3/1957 | Gams et al. | 161—184 |
| 2,806,016 | 9/1957 | Schwarzer | 161—184 X |
| 2,847,343 | 8/1958 | Kohn | 161—184 X |
| 2,890,210 | 6/1959 | Phillips et al. | 260—78.4 |
| 2,924,264 | 2/1960 | Imhof | 174—143 X |
| 2,956,613 | 10/1960 | Edelman et al. | |
| 2,985,616 | 5/1961 | McGary et al. | 161—184 X |
| 3,101,279 | 8/1963 | Wagner et al. | 117—136 |
| 3,102,159 | 8/1963 | Ford | 174—17 |
| 3,102,874 | 9/1963 | Bremmer | 117—136 |

LEWIS H. MYERS, *Primary Examiner.*

LARAMIE E. ASKIN, JOHN F. BURNS, *Examiners.*

D. A. KETTLESTRINGS, *Assistant Examiner.*